United States Patent [19]

Arndt et al.

[11] Patent Number: 4,932,071
[45] Date of Patent: Jun. 5, 1990

[54] AIRCRAFT VOICE COMMUNICATION ANTI-BLOCKING DEVICE

[76] Inventors: Alfred Arndt, 23 Sunday Dr.; John G. Rutty, 60 Maple Grove Rd., both of Hanover, Pa. 17331

[21] Appl. No.: 168,955

[22] Filed: Mar. 16, 1988

[51] Int. Cl.⁵ .............................................. H04B 1/44
[52] U.S. Cl. ....................................... 455/58; 455/78
[58] Field of Search ........................ 455/78, 79, 83, 89, 455/58, 54, 38

[56] References Cited

U.S. PATENT DOCUMENTS

| | | | |
|---|---|---|---|
| 4,305,154 | 12/1981 | Deman et al. | 455/79 |
| 4,366,578 | 12/1982 | Foster et al. | 455/79 |
| 4,494,244 | 1/1985 | Arndt et al. | |
| 4,549,309 | 10/1985 | Corrigan | |
| 4,551,854 | 11/1985 | Rutty et al. | |
| 4,573,215 | 2/1986 | Oates et al. | |

*Primary Examiner*—Reinhard J. Eisenzopf
*Assistant Examiner*—Curtis A. Kuntz
*Attorney, Agent, or Firm*—Kerkam, Stowell, Kondracki & Clarke

[57] ABSTRACT

A device and system for preventing channel blockage on aircraft voice communication frequencies caused either by the pilot beginning a transmission while someone else is transmitting on the same channel or by a stuck microphone condition. The device includes an arrangement so that one does not interrupt other transmitters having the same device. The present device enforces a reciprocity by use of a subaudible tone which is transmitted. If the tone is detected, the device will not interrupt such a transmission. However, if someone else is not transmitting the subaudible tone, the device can ignore their transmission and operate as though the particule radio channel is available for use. An anti-blocking switch extends between the push-to-talk line as connected to the transceiver and the push-to-talk switch. The single anti-blocking switch may be used to inhibit transmission corresponding to a particular channel being occupied and corresponding to a stuck microphone. A circuit is used to detect activation of the push-to-talk switch twice within a given time period and uses that information to close the anti-blocking switch and allow transmission even on an occupied channel. An audio tone and/or a light is provided to the pilot or other radio operator to indicate that a radio transmission is being inhibited. Present radios may be considered as having transmitter priority, a radio using anti-blocking circuitry will have receiver priority.

20 Claims, 3 Drawing Sheets

AIRCRAFT VOICE COMMUNICATION ANTI-BLOCKING DEVICE

BACKGROUND OF THE INVENTION

The present invention relates generally to aircraft voice communication radios such as are normally employed in two-way communication with air traffic control facilities. More particularly, the invention relates to means for preventing interference of the type which arises when two or more radios are transmitting on the same channel frequency.

Two-way voice communications between aircraft and ground-based air traffic control facilities are generally carried out by means of VHF communications transceivers, customarily termed "COM" radios. Typically, COM radios employ amplitude modulation (AM) and operate in a frequency band from 118.0 MHz to 135.95 MHz on any of a plurality of selectable discrete channel frequencies, e.g., on any one of 720 defined channels, with 0.025 MHz channel spacing.

At each radio location, whether within an aircraft or at an air traffic control facility, there is typically a manually-operable push-to-talk (PTT) switch connected through a suitable microphone switch circuit for activating the transmitter circuitry and de-activating the receiver circuitry. Thus, the normal or stand-by mode is the receiver mode. In the case of a hand-held microphone, the PTT switch is normally included within a microphone housing including both a microphone element and the PTT switch. A microphone cord includes both audio and PTT control conductors, and terminates in a suitable microphone plug. In other cases, a so-called boom microphone element is attached to a headset assembly, and the microphone switch is located elsewhere, for example, on the aircraft control yoke. In some cases, the microphone switch is even voice activated. In any event, the transmitter circuitry can be activated any time at the discretion of the radio operator, such as the aircraft pilot.

With such a channelized two-way voice communication system, it will be appreciated that only one station at a time can be transmitting on any given channel frequency (within the distance range of the equipment). The consequence of two transmissions at once in many cases is that neither transmission is intelligible at the receiving station. In other words, the particular radio frequency channel is temporarily rendered useless. This is particularly so since amplitude modulation (AM) is employed in the type of aircraft communications radio here concerned, rather than frequency modulation (FM). FM communications systems exhibit a "capture effect" whereby the strongest signal presented to a receiver is heard clearly, to the complete exclusion of the other, weaker transmissions. However, in AM communication systems, all transmissions on a particular channel frequency are heard in the receiver causing mutual interference. Moreover, since the actual carrier frequencies of several transmitters nominally on the same channel frequency are rarely in fact identical, but rather can differ by up to several KHz, Hertz or beat notes in the form of one or more squeals are normally heard in an AM receiver when more than one transmitter is on the same channel frequency, increasing the effective mutual interference.

There are, in general, two types of situations which lead to the undesirable result of two simultaneous transmissions on a single radio frequency channel. One of these types of situations results from poor radio operating technique, and the other results from equipment malfunction.

More particularly, in order to ensure that a particular channel frequency is not already in use, proper radio operating technique is to always listen before transmitting on the particular channel frequency. However, in practice, proper technique is not always followed. Occasionally pilots transmit on a channel frequency at the same time someone else, either an aircraft or a ground facility, is transmitting on the same channel. This is known as "stepping on" or "blocking" the other transmission.

Even if proper radio technique is being employed, equipment malfunction can cause an inadvertent transmission to occur. More specifically, the microphone switch circuit is susceptible to undesired activation. This undesired activation typically occurs as the result of a short circuit in the microphone cord, the connectors, or the push-to-talk switch itself. Also, there are instances where a microphone is not properly returned to its holder, and instead, is left in a location (e.g., on a seat) where the push-to-talk switch is inadvertently actuated through contact with another object. Although one of these typical situations is an equipment malfunction and the other is actually a form of improper operation, the term "Undesired activation" of the push-to-talk switch circuit is herein employed to refer to these and similar situations. Also, it may be noted that the term "stuck microphone" or "stuck mic" is commonly employed to refer to this condition, and the term is also employed herein.

In many two-way communications systems, the channel blockage which results from two simultaneous transmissions on the same channel may be not more than a minor annoyance. However, in the context of an aircraft communication system, such situations are potentially hazardous. This is particularly so because, in busy air traffic control situations, a controller may be communicating in rapid sequence with a number of aircraft employing brief messages and terse phraseology to maximize the amount of information which can be communicated in a short period of time. At aircraft speeds, situations develop rapidly, and it is important that aircraft communications proceed in a smooth fashion. The potentially hazardous consequence of a missed communication during a critical phase of flight will be well appreciated.

As a partial solution to the problems, our previous U.S. patent application Ser. No. 466,318, filed Feb. 14, 1983, entitled "STEP-OFF DEVICE FOR AIRCRAFT VOICE COMMUNICATION SYSTEM", now U.S. Pat. No. 4,494,244, is directed to systems and devices for preventing the operator of an aircraft radio from beginning a transmission while someone else is transmitting on the same channel. Since this improper technique is commonly referred to as "stepping on" a transmission, we have termed the device which prevents this a "step-off" device (SOD).

Briefly, our previously-disclosed step-off device (SOD) is appropriately connected to the receiving circuitry of the aircraft communication radio to sense when a selected radio frequency channel is in use. When the selected channel is in use, operation of the associated transmitter circuitry is inhibited even though the push-to-talk switch is operated. A particularly advantageous form of step-off device is an external device intended for retrofit connection to an aircraft voice communication type which has ground connection-activated push-to-talk switch circuitry, and the external form of step-off device advantageously derives its operating power from the push-to-talk switch circuit. Thus, no modification is required to either the radio receiver wiring or the aircraft electrical system which otherwise might be required for the purpose of deriving operating power, nor are batteries required which would necessitate frequent replacement to maintain proper operation. Additional details may be had by reference to our U.S. Pat. No. 4,494,244, the entire disclosure of which is hereby expressly incorporated by reference.

The step-off device disclosed by our above patent is generally useful, but it does not address the problem of equipment malfunctions which lead to undesired activation of the microphone switch circuit. In the case of a "stuck microphone", that previous step-off device does not prevent a stuck microphone from blocking a particular channel.

As an improvement and modification upon our earlier patent, our U.S. Pat. No. 4,451,854, issued Nov. 5, 1985, and hereby are incorporated by reference, shows an arrangement whereby a "stick microphone reliever" (SMR) is combined with the SOD into a single device referred to as an "anti-blocking device" (ABD). The preferred embodiment of that design uses two semiconductor switches in series with the standard push-to-talk (PTT) switch. One of the semiconductor switches is controlled by the SOD and the other of the semiconductor switches is controlled by the SMR. If the SOD switch opens because the channel is in use, or the SMR switch opens because a condition indicative of a stuck microphone is detected, the transmitter is not enabled upon pushing the PTT switch. The SMR part of that previous design has a timing circuit which opens the SMR semiconductor switch upon transmission continuing for beyond a predetermined interval such as 15 seconds.

Although the ABD of our above patent is a quite useful design, it has been subject to some limitations.

One problem with our previous ABD design is that it may under some conditions penalize the user of the design. For example, assume that two airplanes are trying to communicate upon the same channel and only one of the planes has the previous ABD. The airplane having the ABD will not be able to "step-on" the airplane which does not have the ABD. However, the airplane which does not have the ABD will still be able to "step-on" the transmission from the airplane which has the ABD. By putting someone at a competitive disadvantage for using the safety features of an ABD, one is building in a disincentive for its use. Although government regulation might overcome such a disincentive, it remains a limitation with the previous ABD design.

Our previous ABD design also incorporated an additional manually operable bypass switch to by-pass the ABD if it is malfunctioning or the pilot has an absolute emergency where he must transmit regardless of other signals on the channel.

A further problem of the previous ABD design is that the SMR took a relatively long time interval in order to reset the timer. That is, when the SMR switch opened due to an extended transmission it took a relatively long time for the SMR to recycle such that transmission could start again.

The preferred embodiment of our previous ABD arrangement used two switches in series in order to provide the SOD and SMR functions. The use of two such semiconductor switches increases the complexity of the ABD switching arrangement of the '854 patent beyond that of the simpler SOD only arrangement of our prior '244 patent.

Our previous ABD design further does not provide an audio signal to indicate to a pilot that transmission was inhibited.

SUMMARY OF THE INVENTION

It is a primary object of the present invention to provide a new and improved aircraft voice communication anti-blocking device and system using that device.

A more specific object of the present invention is to provide an ABD which uses a single controlled switch in series with the PTT switch in order to realize both SOD and SMR features, thereby better coordinating the two conditions under which transmission should be inhibited and providing a more reliable arrangement and lower voltage drop than the previous 2 controlled switch preferred embodiment of our most recent patent.

A further object of the present invention is to provide an ABD which will not yield or inhibit transmission in favor of others who do not have ABDs, thereby providing incentive for others to incorporate ABDs.

A still further object of the present invention is to provide a convenient method of overriding the ABD which does not require using a manual switch in series with the PTT switch.

Yet another object of the present invention is to provide an ABD which provides a clear indication to the pilot or other person operating the radio that a transmission was inhibited.

A further object of the present invention is to provide improved circuitry for realizing SOD and SMR function, such as improved latching for the SOD function and improved timing circuitry for the SMR function.

The above and other objects of the present invention which will become more apparent as the description proceeds are realized by an anti-blocking device for preventing radio transmission on an occupied channel and for cutting off transmission upon occurrence of a stuck microphone. The anti-blocking device includes: a step-off circuit for detecting transmission on a radio channel and outputting an occupied signal upon the presence of a transmission on the radio channel; a stuck microphone circuit for detecting a condition indicative of a stuck microphone and outputting a stuck signal upon the detection of the condition; an anti-blocking switch for insertion in a series with a push-to-talk switch in a push-to-talk line of a transceiver, the anti-blocking switch being a controlled switch and having a controlled terminal; and a logic circuit connected to receive the occupied signal and the stuck signal and having a switch control output for supplying an inhibit signal to the controlled terminal, the logic circuit operable to open the anti-blocking switch upon the generation of the inhibit signal corresponding to the occurrence of either or both of the occupied signal and the stuck signal. The step-off circuit includes a latch which, in the absence of the occupied signal, blocks the generation of an occupied signal upon closing of the push-to-talk switch. The anti-blocking switch is always open when the inhibit signal is supplied. The anti-blocking device may further comprise a sound generator operable to generate sound when the push-to-talk switch is closed at the same time the inhibit signal is present. The step-off circuit includes a threshold detector for detecting transmission and a tone decoder for detecting the presence of a tone in the transmission. The step-off circuit generates the occupied signal only when both the transmission and the tone are detected. The anti-blocking device may further include an override circuit having a first monostable multivibrator and a second monostable multivibrator, the first monostable multivibrator outputting an enable pulse to the second monostable multivibrator responsive to a change in state of the push-to-talk switch, the second monostable multivibrator outputting an override pulse in response to a change in state of the push-to-talk switch during the occurrence of the enable pulse, the override pulse supplied to the step off circuit to end or remove the occupied signal regardless of the presence of transmission on the radio channel. The anti-blocking device may be part of a system further comprising a transmitter and a receiver, both linked by a push-to-talk switch, the anti-blocking switch operable when opened to inhibit transmission on the transmitter. The stuck microphone circuit detects transmission of the transmitter beyond a certain time duration by using an R-C circuit. The R-C circuit may charge a capacitor through a resistor during the transmission, the capacitor discharging through a diode in parallel with the resistor upon opening the push-to-talk switch.

The invention may be alternately described as a device for preventing radio transmission upon an occupied channel and having: a step-off circuit for detecting transmission on a radio channel, the step-off circuit having a threshold detector for detecting transmission and a tone decoder for detecting the presence of a tone in the transmission, the step-off circuit generating an occupied signal only when both the transmission and the tone are detected; and an anti-blocking switch for insertion in series when a push-to-talk switch in a push-to-talk line of a transceiver, the anti-blocking switch being a controlled switch and having a controlled terminal and opening when the occupied signal is present such that transmission is inhibited. The step-off circuit may alternately generate the occupied signal when either a transmission or the tone is detected. The tone is a frequency below 300 Hertz. The device further comprises a tone encode operable to provide a tone to outgoing transmissions. The device further comprises a sound generator operable to generate sound when the push-to-talk switch is closed at the same time as the occupied signal is present. The device further includes a stuck microphone circuit and a logic circuit as discussed above.

The invention may alternately be described as a device for preventing radio transmission on an occupied channel and having: a step-off circuit for detecting transmission on a radio channel and outputting an occupied signal upon the presence of transmission on the radio channel; an anti-blocking switch for insertion in series with a push-to-talk switch in a push-to-talk line of a transceiver, the anti-blocking switch being a controlled switch and having a control terminal, the anti-blocking switch opening when the occupied signal is present such that transmission is inhibited; and an override circuit having a first monostable multivibrator and a second monostable multivibrator, the first monostable multivibrator outputting an enable pulse to the second monostable multivibrator responsive to a change in state of the push-to-talk switch, the second monostable multivibrator outputting an override pulse in response to a change in state of the push-to-talk switch during the occurrence of the enable pulse, the override pulse applied to the step-off circuit to end or remove the occupied signal regardless of the presence of transmission on the radio channel.

BRIEF DESCRIPTION OF THE DRAWINGS

The present invention that will be more readily understood when the detailed description is considered in conjunction with the accompanying drawings wherein in like characters represent like parts throughout the several views and in which.

DETAILED DESCRIPTION OF THE DRAWINGS

Figure 1:
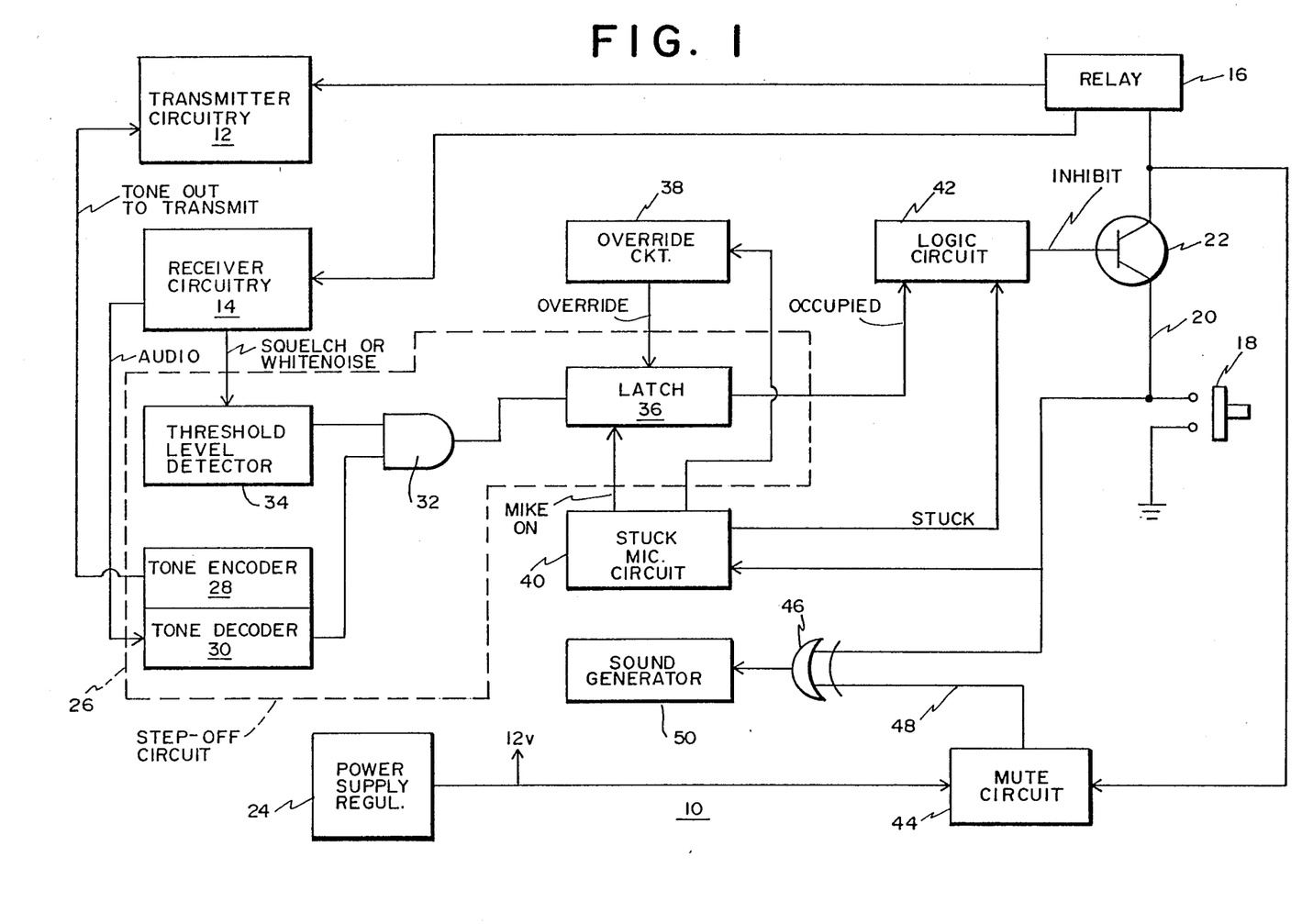
FIG. 1 is a block diagram of a first embodiment of the present invention.

FIG. 1 shows a block diagram of a system 10 according to the present invention. The system 10 includes transmitter circuitry 12 and receiver circuitry 14. If desired, some of the circuitry may be shared between the transmitter and receiver in various well known fashions. A relay 16 is used as a controlled switching element for selectively activating and deactivating parts of the transmitter circuitry 12 and receiver circuitry 14 depending upon whether one is transmitting or receiving at a particular time. The transmitter and receiver may be connected to an antenna in a well known fashion. The details of the transmitter circuitry 12, receiver circuitry 14, and relay 16 need not be discussed in detail as any of various known configuration may be used.

The relay 16 is ordinarily operated directly by a pus-to-talk switch 18 on a push-to-talk line 20. Upon depressing the switch 18, the relay 16 is ordinarily operated so that the transmitter circuitry 12 may transmit voice communication through a microphone (not shown) connected to the transmitter. Release of the switch 18 normally causes the relay 16 to end transmission.

The present invention uses an anti-blocking controlled switch 22 in series between the relay 16 and the push-to-talk switch 18. Assuming that the transistor switch 22 is closed, operation of the push-to-talk switch 18 controls the relay 16 in the usual manner. However, the present invention causes the opening of the switch 22 under certain condition in order to inhibit the relay 16 from responding to the push-to-talk switch 18.

Except for the transmitter circuitry 12, receiver circuitry 14, relay 16, and push-to-talk switch 18, the remainder of the circuitry of system 10 may be considered as an anti-blocking device. A power supply regulator 24 provides 12 volts to various of the circuit components, not all of the connections being shown for simplicity. The power supply regulator 24 could be shared with circuitry used to supply power to the transmitter circuitry 12 and/or the receiver circuitry 14. Although the various components of the anti-blocking device are shown incorporated into a transceiver system 10, it will be appreciated that various aspects of the present invention could be provided to interrupt the PTT line at other locations such as in the radio control panel for internal modifications.

A step-off device or circuit 26 is used to prevent the pilot or radio operator of system 10 from "stepping-on" a transmission of someone else. Specifically, the step-off device 26 advantageously will avoid stepping on the transmission of another only when the other operator has a similar step-off device. In other words, the system 10 does not extend a courtesy to the person using system 10.

The step-off circuit 26 includes a tone encoder 28 which provides a sub-audible tone, preferably between 67 and 200 hertz. The tone is feed to the transmitter circuitry 12 where it is transmitted. When the tone is received by the receiver circuitry 14 of a similar unit, the tone on the audio line is fed to a tone decoder 30 which detects the presence of the tone and supplies it to AND gate 32. The gate 32 will output a one or high only if the tone is detected and if a threshold level detector 34 detects a signal on the particular radio channel. Alternately, the gate 32 could be an OR gate in which case presence of either a signal above the threshold or the tone would provide a high output to inhibit transmission in the manner detailed as follows. Although the threshold level detector 34 is shown connected to the squelch of the receiver circuitry 14, other arrangments could be used as discussed in more detail in our previous patents.

The output of the gate 32 supplies a latch 36 which outputs an occupied signal when the gate 32 indicates the presence of a transmission having the requisite tone under 300 Hertz on a particular radio channel. An override circuit 38 is used to set the latch 36. Basically, the pilot or other aviator can depress the push-to-talk switch 18 twice very quickly in an emergency situation where he must transmit notwithstanding the presence of a radio transmission on the channel. The override signal stops the generation of the occupied signal such that transmission may start. As shown, the latch circuit 36 receives a mic on signal. The mic on signal prvents the latch 36 from starting the generation of the occupied signal when the push-to-talk switch 18 is already depressed such that one is transmitting. In other wors, during transmission by the system 10 the occupied signal cannot be generated. The line on which the mic on signal is supplied serves as an enable line for the latch 36. When this enable line is high, the latch output follows the input as supplied from gate 32. When the enable line goes low upon depression of switch 18, the output of the latch is latched and changes to the input no longer affect the output. The stuck mic circuit is connected as shown to the push-to-talk switch 18 and generates a stuck signal when it detects a condition corresponding to a possible stuck microphone.

The stuck and occupied signals are both applied to a logic circuit 42. The logic circuit 42 generates an inhibit signal when either of the occupied or stuck signals or both the occupied ans stuck signals are present. The inhibit signal is supplied to the control terminal of semiconductor switch 22, preferably an ECG 184, in order to open the switch. Upon opening of the semiconductor switch 22, the relay 16 will be maintained in the receive position.

A mute circuit 44 is connected to the anti-blocking switch 22 and is used to control a mute relay (not shown). The mute relay is used in known fashion to mute the cockpit speakers when their use at full volume would create a nuisance. As will be discussed below, the mute circuit 44 is positioned so that the mute function will prevent muting in the case of a transmit attempt which is inhibited by the switch 22. The mute circuit 44 provides an output to an exclusive or gate 46. The signal supplied to gate 46 on line 48 is specifically a signal indicative of the condition of the upper or collector terminal of switch 22. If the upper terminal of switch 22 is grounded, the signal on line 48 is likewise at ground. This corresponds to both the switch 22 and switch 18 being closed such that both input to gate 46 are low (assuming a positive). The output from the gate 46 would be low and a sound generator 50 would be maintained off. The sound generator 50 is connected to anti-blocking switch 22 by way of gate 46. However, if the switch 18 is closed, but the anti-block switch 22 is opne, the gate 46 will output a positive signal causing the sound generator 50 to generate a sound warning for the pilot that his attempt to transmit is being inhibited. An optional light (not shown) could also be used at the output of gate 46 to warn the pilot that transmission is inhibited. another light (not shown) could be connectd to the mute circuit 44 to serve as a transmit light which lights up during transmission.

Figure 2:
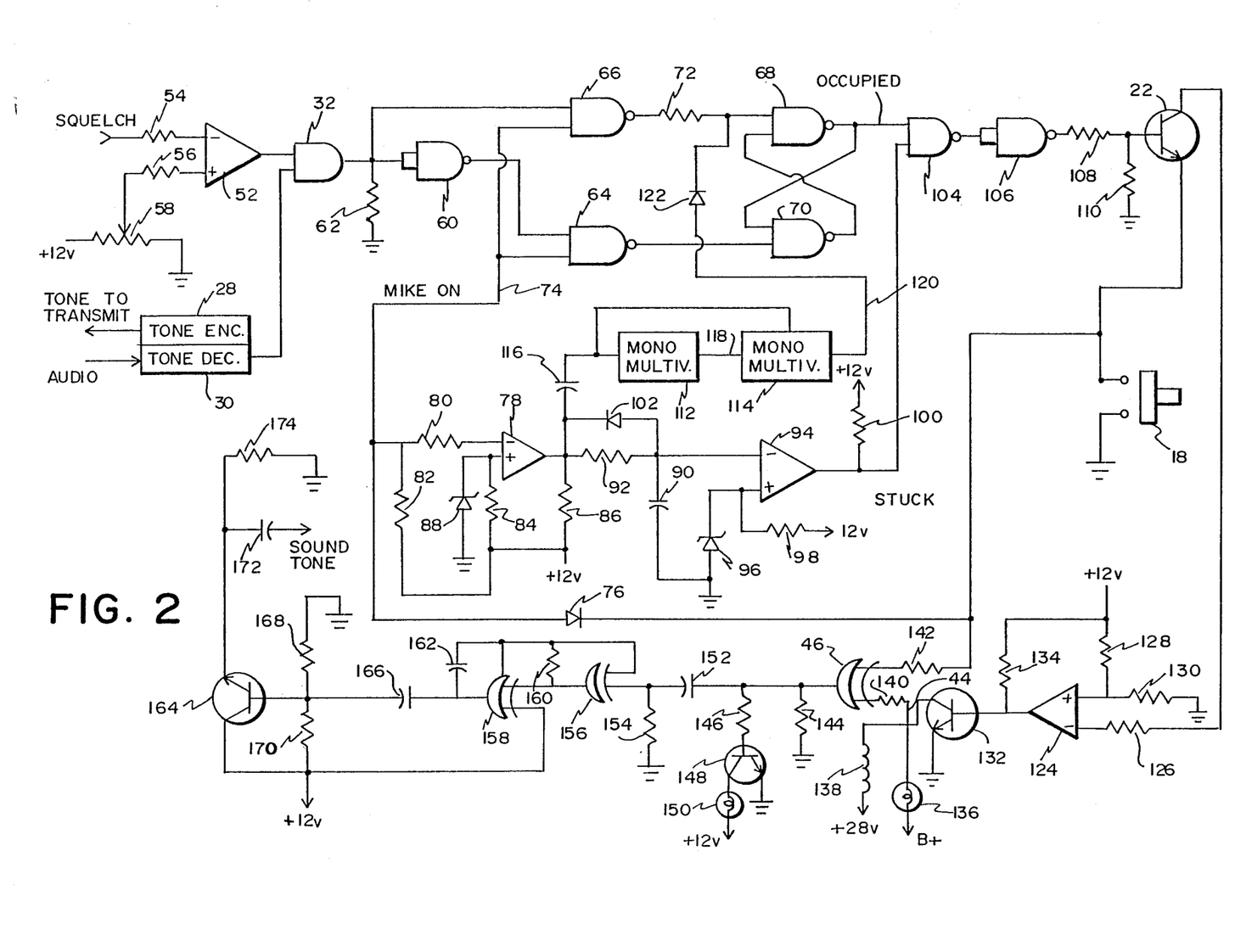
FIG. 2 is a schematic corresponding to parts of FIG. 1.

FIG. 2 shows dtailed structures which may be used to realize the system of FIG. 1. However, the transmitter circuitry 12, receiver circuitry 14, and relay 16 are not included in FIG. 2 as each of these components may be realized by standard structure. Likewise, the power regulator 24 is not shown in FIG. 2, but it may be realized by a 7812 chip receiving an input voltage of between 14 and 28 volts and having a ten microfared capacitor across its input terminals and a one microfarad capacitor across its output terminals. The regulator would be used to supply 12 volts to the various circuit components of FIG. 2. For ease of illustration, the power supplied to the various logic gates and ground connections to the chip corresponding to the various logic gates are not shown in FIG. 2. The tone encoder 28 and tone decoder 30, which are shown together as they may be part of a single module, are of standard construction and need not be shown in detail.

The threshold level detector 34 of FIG. 1 is realized by a comparator 52 having inputs connected to resistors 54 and 56. Resistor 56 is connected to a variable resistor 58 which allows one to set the threshold corresponding to the comparator 52 indicating the presence of a signal on a particular radio channel. The output of the gate 32 is high only when a particular radio channel is occupied as indicated by comparator 52 and the transmitter which is occupying the channel includes the subaudible tone detected by tone decoder 30.

The output of gate 32 is supplied to a gate 60 having resistor 62 also connected to its input. The output from the gate 60 is supplied to a gate 64, the other input of which is a mic-on signal also suppled to gate 66. Gates 64 and 66 are respectively connected to cross-coupled gates 68 and 70. The connection between gate 66 and gate 68 being by way of resistor 72. When the line 74 is high, the output to gate 68 follows the input to gate 60. However, when the line 74 goes low corresponding to a mic-on signal, the output of gate 68 will be latched to the state at which the input was at that particular moment. In other words, if the output of gate 32 indicates that the channel is available for use, depression of the push-to-talk switch 18 generates the mic-on signal on line 74 to latch the output of gate 68 such that it indicates availability. If during the mic-on signal, the input to gate 60 changes, the output to gate 68 will remain as it was upon initiation.

The mic-on signal on line 74 is provided from between the anti-blocking switch 22 and the push-to-talk switch 18 by way of an isolation diode 76. The line 74 also feeds a comparator 78 by way of resistor 80. Resistors 82, 84, and 86 are used in conjunction with comparator 78. A 5 volt Zener diode 88 provides a five volt input to the positive terminal of comparator 78. When the push-to-talk switch 18 is closed, the negative input to the comparator goes low such that the comparator's output goes high. When the output of comparator 78 is high, it charges capacitor 90 by way of resistor 92. The values of the capacitor 90 and resistor 92 determine the maximum time of transmission which is allowed. A preferred embodiment might allow 15 seconds by using a 10 microfarad capacitor and one meg resistor. The voltage across capacitor 90 is supplied to the negative input of comparator 94, which has a 9 volt Zener diode 96 and pull-up resistor 98 connected to its other input. When the voltage across capacitor 90 exceeds 9 volts, the transmission has extended sufficiently long that a stuck microphone condition may exist. Accordingly, the output of comparator 94 goes low corresponding to the generation of a stuck signal at the output. A pull-up resistor 100 is connected at the output of comparator 94.

The generation of the stuck signal or low at the output of comparator 94 will halt the transmission as will be discussed below. However, the present arrangement advantageously allows very fast recycling of the stuck microphone circuit, including comparators 78 and 94 by simply releasing the push-to-talk switch 18 momentarily and then depressing it again. When the push-to-talk switch 18 is released, the output of comparator 78 goes low such that capacitor 90 may quickly discharge by way of diode 102.

Upon generation of either of the stuck or occupied signals, the switch 22 will be opened by the logic circuit having gate 104 and gate 106 connected to the base of transistor 22 by way of resistor 108. The base or control terminal of the switch 22 is also connected to pull-down resistor 110.

If a radio channel is occupied, or if the system is somehow malfunctioning, and the pilot must transmit, the system provides an override circuit corresponding to first and second monostable multivibrator 112 and 114. The input to monostable multivibrator 112 is provided from the output of comparator 78 by way of capacitor 116. When the output of capacitor 116 is a falling edge corresponding to release of the switch 18 the first monostable multivibrator 112 outputs a short pulse (a preferred emobidment might use a pulse of 1 second or less) on an enable line 118 which allows the second monostable multivibrator 114 to become operational. If during the 1 second time interval, the switch 18 is again depressed, the output of the capacitor 116 is also provided to monostable multivibrator 114 which would then be triggered on the rising edge to generate an output on line 120. The output on line 120 is fed to the input to gate 68 by way of diode 122. The output of monostable multivibrator 114 going high will force the gate 68 to suppress the generation of the occupied signal. Indeed, the occupied signal would be almost immediately ended upon the override circuit corresponding to monostable multivibrators 112 and 114 detecting the rapid recycling switch 18.

The mute circuit is realized by a comparator 124 which is connected to the collector of transistor switch 22 by way of resistor 126. The positive input to the comparator 124 is provided by resistors 128 and 130 extending between 12 volts and ground as shown. When the transistor 22 is closed and the push-to-talk switch 18 is closed, the comparator provides a high output which is supplied to the base of transistor 132. A resistor 134 extends between the base of transistor 132 and 12 volts. Upon the switching on of transistor 132, an indicator light 136 will be turned on, thereby indicating that the transmitter is in operation. Additionally, a mute relay coil 138 will be activated. The mute relay coil 138 is commonly used in aircraft flight communication systems so as to mute the cockpit speakers when a transmission is being made.

The output of transistor 132 is fed on line 44 to gate 46 by way of resistor 140. The other input to the exclusive OR gate 46 is provided from the emitter of anti-blocking transistor switch 22 by way of resistor 142. When the push-to-talk switch 18 is closed, but the anti-block switch 22 is opened due to an occupied radio channel or a stuck microphone signal, the output of gate 46 will be high. The ouput of gate 46 is connected to resistor 144 and resistor 146. Resistor 146 in turn leads to the base of transistor 148 connected to optional light 150. If the transmission is blocked, the transistor 148 will turn on and in turn cause the light 150 to turn on.

The output of gate 46 is also fed to a capacitor 152 and resistor 154 which provide a momentary pulse at the lower input of a gate 156 upon the gate 46 generating a high output. The gate 156 functions as an oscillator together with gate 158, resistor 160, and capacitor 162. The output of gate 158 is provided to an emitter follower transistor 164 by way of capacitor 166 having resistors 168 and 170 in circuit therewith. The emitter follower transistor 164 provides a tone by way of capacitor 172 with resistor 174 connected in circuit therewith. The sound tone generated would be a short duration tone indicating to the pilot that his attempt to transmit was being inhibited by the anti-blocking device. The sound tone from this sound generator circuitry would, of course, be provided to the headphone and/or speaker (not shown) as desired.

It should be noted that the latch composed of NAND gates 60, 64, 66, 68, and 70 defeats an attempt to transmit by holding the push-to-talk switch 18 down or closed when a channel is occupied and waiting until the channel becomes available. Because the mic-on signal on line 74 prevents the output of gate 68 from changing as long as the push-to-talk switch 18 is depressed, the push-to-talk switch 18 cannot be held continuously down to wait until the channel becomes available. Instead, the push-to-talk switch 18 must be initially depressed when the channel is available and the occupied signal is not present.

Figures 3, 4, 5:
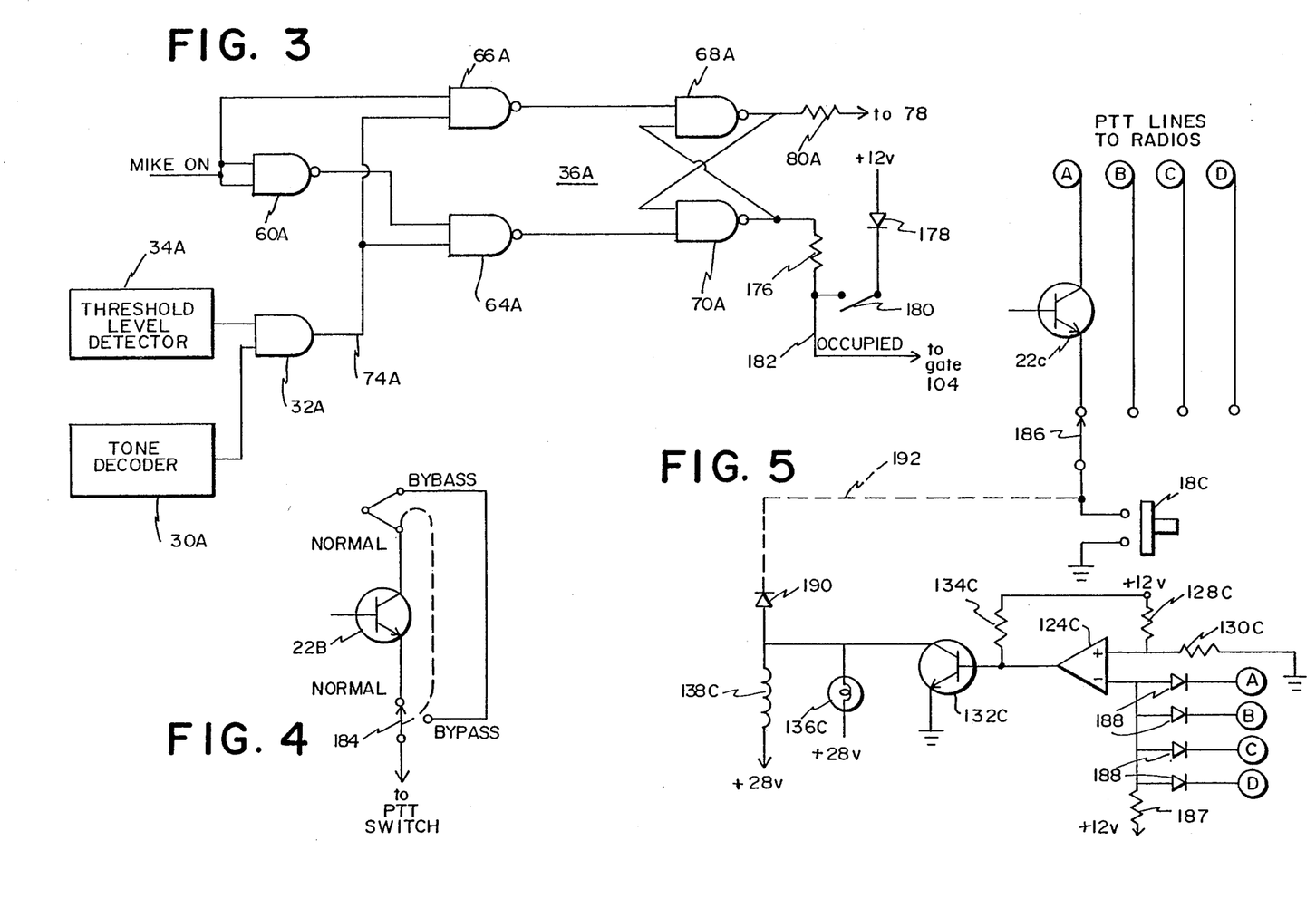
FIG. 3 shows an alternate arrangment for a portion of the circuit of FIG. 2.
FIG. 4 shows an alternate arrangment for a portion of the circuit of FIG. 2.
FIG. 5 shows the adaptation of the present invention for a multiple transceiver system.

FIG. 3 shows an alternative arrangement whereby one may continually depress the push-to-talk switch 18 (not shown in FIG. 3) and transmission may begin immediately upon the channel becoming available. FIG. 3 shows modified arrangment of the gates associated with the latch of FIG. 2. The components of FIG. 3 have been labeled with a number of the corresponding component, if any, from FIGS. 1 and 2 except that the suffix "A" has been added. In the arrangement of FIG. 3, the mic on signal (which would be supplied in the same fashion as shown in more detail in FIG. 2) is provided to the gate 60A, whereas, the output of gate 32A is provided to the enable line corresponding to 74A.

The arrangement of FIG. 3 might advantageously be used to give an air traffic controller some priority over a pilot if the pilots used the arrangement of FIG. 2. The air traffic controller could simply hold his push-to-talk switch down and upon the output of gate 32A indicating that the channel is available, the transmission could immediately begin. The air traffic controller would not need to repeatedly depress his push-to-talk switch until the channel was unoccupied. If the arrangement of FIG. 3 was used on a relatively widespread basis, it might also be advantageous to include a random delay element between the output of gate 32A and the inputs to gates 64A and 66A. Such a random delay element would minimize the possibility that more than one person would be switched to a transmit mode at essentially the same time. For example, if two persons using the arrangement of FIG. 3 both were depressing their push-to-talk switch and the channel became available, they would both begin transmitting at essentially the same time. However, if each of the systems included a random delay element or a random clock gated to the output of gate 32A, the simultaneous transmission would be avoided. In other words, such an arrangement could provide for the inputs to gates 64A and 66A on line 74A becoming low a random time interval after the output of gate 32a goes low. It should be noted that the output of the latch 36a is taken from gate 70a and supplied through resistor 176 to provide an occupied signal to the gate 104 in similar fashion to the arrangement for FIG. 2.

To avoid having the struck microphone timing capacitor 90 (FIG. 2 only) charge up before transmission begins when the FIG. 3 arrangement is used, the connection between resistors 80 and 82 (FIG. 2) would be severed and resistor 80A (FIG. 3) would be used in lieu of resistor 80 to connect to the negative input of comparator 78 (FIG. 2). Therefore, the timing capacitor 90 would only start charging when the transmission begins even if the switch 18 is closed.

The arrangement of FIG. 3 also shows an alternate to the override circuit. Instead of using the rapid recycling type of override circuit, a diode 178 is connected to 12 volts and to switch 180. Switch 180 is an override switch such that closing the switch inhibits the generation of the occupied signal by forcing line 182 high. If desired, the rapid recycling circuit discussed above could also be used in conjunction with the override switch 180 in FIG. 3. The override switch could be used in conjunction with the latch arrangement of FIG. 2 or the alternate latch arrangement of FIG. 3.

FIG. 4 shows a modified arrangement for by-passing the anti-blocking switch. In particular, the anti-blocking switch 22B of FIG. 4 is shown in combination with a double pole double throw switch 184 having a normal position and a bypass position. In the normal position, the collector and emitter of transistor switch 22B would be connected in circuit in the same fashion as switch 22 of FIGS. 1 and 2. When the switch 184 is thrown to the bypass position, the transistor 22B will be taken completely out of the circuit and transmission may proceed independent of further operation of the antiblocking device. Alternately, a single pole single throw switch could be used to bypass switch 22B in similar fashion to the bypass switch disclosed in our previous Pat. No. 4,551,854.

FIG. 5 shows a way in which the present invention can be used in connection with a system having a number of different radios. The components of FIG. 5 include the letter C with the same numerals as the corresponding component, if any, of the embodiment of FIG. 2. In particular, a antiblocking switch 22C would be connected into a circuit as discussed in detail above in conjunction with FIG. 2. The particular radio (or public address system) which would be activated depends upon the position of a selector switch 186. The arrangement of FIG. 5 includes only a single antiblocking switch 22c corresponding to a single antiblocking device which would be configured like that of FIG. 2. However, depending upon the types of radios in use, separate antiblocking devices could be used for each of the radios.

The mute circuit of FIG. 5 includes a comparator 124C and resistors 128C, 130C, 134C, which would function in identical fashion to that circuit of FIG. 2. However, the negative input to the comparator 124C is connected to pull-up resistor 187 and is provided from each of the push-to-talk lines of the radios at points A through D above the switch 186. This input is provided by way of diodes 188. Upon any of the push-to-talk lines being grounded, the comparator 124C turns on transistor 132C such that light 136C indicates that transmission is being made. The output to transistor 132C also activates the mute coil 138C. It should also be noted that a diode 190 and phantom line 192 are shown in FIG. 5 to indicate the usual or conventional connection of the mute relay coil 138C. Generally, the coil 138c is connected to the push-to-talk line immediately above the push-to-talk switch 18c by way of a diode 190 and a connection line 192. The present system would have the connections removed corresponding to line 192. Likewise, the diode 190 could be removed.

Although various specific arrangements and structures have been described herein, it is to be understood that these are for illustrative purposes only. Various modification and adaptations will be readily apparent to those skilled in the art. Accordingly, the scope of the present invention should be determined by reference to the claims appended hereto.

What is claimed is:

1. An anti-blocking device for preventing radio transmission on an occupied channel and for cutting-off transmission upon occurrence of a stuck microphone and having:
    a step-off circuit for detecting a received transmission on a radio channel and outputting an occupied signal upon the presence of received transmission on the radio channel;
    a stuck microphone circuit for detecting a condition indicative of a stuck microphone and outputting a stuck signal upon the detection of said condition;
    an anti-blocking switch for insertion in series with a push-to-talk switch in a push-to-talk line of a transceiver, said anti-blocking switch being a control switch and having a control terminal; and a logic circuit connected to receive said occupied signal and said stuck signal and having a switch control output for supplying an inhibit signal to said control terminal, said logic circuit operable to open said anti-blocking switch upon the generation of said inhibit signal corresponding to the occurrence of either or both of the occupied signal and the stuck signal.

2. The device of claim 1 wherein said step-off circuit includes a latch which, in the absence of the occupied signal, blocks the generation of an occupied signal upon closing of the push-to-talk switch.

3. The device of claim 1 wherein said anti-blocking switch is always open when said inhibit signal is supplied.

4. The invention of claim 1 wherein said anti-blocking device further comprises a sound generator connected to said anti-blocking switch to generate sound when the push-to-talk switch is closed at the same time as the inhibit signal is present.

5. The device of claim 1 wherein said step-off circuit includes a threshold detector for detecting transmission and a tone decoder for detecting the presence of a tone in the transmission and said step-off circuit generates the occupied signal upon detection of a transmission and/or the tone.

6. The device of claim 1 wherein said anti-blocking device further includes an override circuit connected to said step-off circuit and having a first monostable multivibrator and a second monostable multivibrator, said first monostable multivibrator outputting an enable pulse to said second monostable multivibrator responsive to a change in state of said push-to-talk switch, said second monostable multivibrator outputting an override pulse in response to a change in state of the push-to-talk switch during the occurrence of the enable pulse, said override pulse supplied to said step-off circuit to end the occupied signal regardless of the presence of received transmission on the radio channel such that outgoing transmission is allowed.

7. The device of claim 1 comprising an aircraft voice communication radio having a transmitter and a receiver, both linked by a push-to-talk switch, and operable at any one of a plurality of radio frequency channels, said anti-blocking switch operable when opened to inhibit transmission on said transmitter.

8. The device of claim 1 wherein said stuck microphone circuit detects transmission of said transmitter beyond a certain time duration by use of an R-C circuit.

9. A device for preventing radio transmission on an occupied channel and having:
   a step-off circuit for detecting received transmission on a radio channel, said step-off circuit having a tone decoder for detecting the presence of a tone in the received transmission, the tone being sub-audible, said step-off circuit generating an occupied signal depending upon detection of the tone; and
   an anti-blocking switch for insertion in series with a push-to-talk switch in a push-to-talk line of a transceiver, said anti-blocking switch being a controlled switch and having a control terminal and opening when said occupied signal is present such that outgoing transmission is inhibited.

10. The device of claim 9 wherein said step-off circuit further includes a threshold detector for detecting received transmission and said step-off circuit generates an occupied signal depending on detection of a transmission and/or the tone.

11. The device of claim 10 wherein said step-off circuit generates an occupied signal only when both a received transmission and the tone are detected.

12. The device of claim 10 wherein said device further comprises a sound generator connected to said anti-blocking switch to generate sound when the push-to-talk switch is closed at the same time as the anti-blocking switch is open.

13. The device of claim 10 wherein said device further includes an override circuit having a first monostable multivibrator and a second monostable multivibrator, said first monostable multivibrator outputting an enable pulse to said second monostable multivibrator responsive to a change in state of said push-to-talk switch, said second monostable multivibrator outputting an override pulse in response to a change in state of the push-to-talk switch during the occurrence of the enable pulse, said override pulse supplied to said step-off circuit to end the occupied signal regardless of the presence of received transmission on the radio channel.

14. The device of claim 13 wherein said device is an anti-blocking device further including:
   a stuck microphone circuit for detecting a condition indicative of a stuck microphone and outputting a stuck signal upon the detection of said condition; and a logic circuit connected to receive said occupied signal and stuck signal and having a switch control output for supplying an inhibit signal to said control terminal, said logic circuit operable to open said anti-blocking switch upon the generation of said inhibit signal corresponding to the occurrence of either or both of the occupied signal and the stuck signal.

15. A device for preventing radio transmission on an occupied channel and having:
   a step-off circuit for detecting a received transmission on a radio channel and outputting an occupied signal upon the presence of the received transmission on the radio channel;
   an anti-blocking switch for insertion in series with a push-to-talk switch in a push-to-talk line of a transceiver, said anti-blocking switch being a controlled switch and having a control terminal, said anti-blocking switch opening when the occupied signal is present such that outgoing transmission is inhibited; and
   an override circuit connected to said step-off circuit and having a first monostable multivibrator and a second monostable multivibrator, said first monostable multivibrator outputting an enable pulse to said second monostable multivibrator responsive to a change in state of the push-to-talk switch, second monostable multivibrator outputting an override pulse in response to a change in state of the push-to-talk switch during the occurrence of the enable pulse, said override pulse supplied to said step-off circuit to remove the occupied signal regardless of the presence of received transmission on the radio channel such that outgoing transmission is allowed.

16. The device of claim 15 wherein said step-off circuit includes a latch which, in the absence of the occupied signal, blocks the generation of an occupied signal upon closing of the push-to-talk switch.

17. The device of claim 16 wherein said step-off circuit includes a threshold detector for detecting a received transmission and a tone decoder for detecting the presence of a tone in the transmission and said step-off circuit generates the occupied signal upon detection of a received transmission and the tone.

18. The device of claim 16 wherein said device is an antiblocking device and further includes:
   a stuck microphone circuit for detecting a condition indicative of a stuck microphone and outputting a stuck signal upon the detection of said condition; and
   a logic circuit connected to receive said occupied signal and stuck signal and having a switch control output for supplying an inhibit signal to said control terminal, said logic circuit operable to open said anti-blocking switch upon the generation of said inhibit signal corresponding to the occurrence of either or both of the occupied signal and the stuck signal.

19. The device of claim 15 further comprising a transmitter and a receiver, both linked by a push-to-talk switch, said antiblocking switch operable when opened to inhibit transmission on said transmitter.

20. The device of claim 19 wherein said device further comprises a tone encoder connected to said transmitter to provide a tone to outgoing transmissions and said tone is below 300 Hertz.

* * * * *

UNITED STATES PATENT AND TRADEMARK OFFICE
CERTIFICATE OF CORRECTION

PATENT NO. : 4,932,071

DATED : June 5, 1990

INVENTOR(S) : Alfred ARNDT and John G. RUTTY

It is certified that error appears in the above-identified patent and that said Letters Patent is hereby corrected as shown below:

ON TITLE PAGE: Abstract
Line 13, change "particule" to -- particular --;

Column 12, line 55, Claim 1, change "control" to -- controlled --;

Column 13, line 4, Claim 4, change "invention" to -- device --;

Column 13, line 14, Claim 5, change "and/or" to -- and --.

Signed and Sealed this

Fifth Day of November, 1991

*Attest:*

HARRY F. MANBECK, JR.

*Attesting Officer*   *Commissioner of Patents and Trademarks*